US007370115B2

(12) United States Patent
Bae et al.

(10) Patent No.: US 7,370,115 B2
(45) Date of Patent: May 6, 2008

(54) METHOD OF CONTROLLING TERMINAL OF MPEG-4 SYSTEM USING CACHING MECHANISM

(75) Inventors: Dae-gyu Bae, Suwon (KR); Sang-rae Lee, Suwon (KR); So-young Kim, Suwon (KR); Hyun-ah Sung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 633 days.

(21) Appl. No.: 10/277,739

(22) Filed: Oct. 23, 2002

(65) Prior Publication Data
US 2003/0126278 A1 Jul. 3, 2003

(30) Foreign Application Priority Data
Dec. 28, 2001 (KR) ................. 2001-86777

(51) Int. Cl.
*G06F 15/16* (2006.01)
(52) U.S. Cl. ............... 709/231; 709/203; 709/219; 709/226; 709/223; 375/240.11
(58) Field of Classification Search ........ 709/224–231, 709/219; 718/102; 382/243, 251; 375/240.25
See application file for complete search history.

(56) References Cited

U.S. PATENT DOCUMENTS

| 6,185,625 | B1 * | 2/2001 | Tso et al. ............. 709/247 |
| 6,230,200 | B1 * | 5/2001 | Forecast et al. ........... 709/226 |
| 6,577,679 | B1 * | 6/2003 | Apostolopoulos ...... 375/240.12 |
| 6,584,152 | B2 * | 6/2003 | Sporer et al. .......... 375/240.01 |
| 6,625,750 | B1 * | 9/2003 | Duso et al. ............... 714/11 |
| 6,925,499 | B1 * | 8/2005 | Chen et al. .............. 709/226 |
| 6,978,306 | B2 * | 12/2005 | Miller et al. .............. 709/226 |
| 2001/0047456 | A1 | 11/2001 | Schrobenhauzer et al. |
| 2003/0118243 | A1 * | 6/2003 | Sezer et al. ............ 382/245 |

FOREIGN PATENT DOCUMENTS

| EP | 1 006 726 A2 | 6/2000 |
| EP | 1 133 190 A1 | 9/2001 |

OTHER PUBLICATIONS

"MPEG-4: Audio/Video and Synthetic Graphics/Audio for Mixed Media", Peter K. Doenges, et al., Signal Processing-Image Commmunication, vol. 9, No. 4, May 1, 1997, pp. 433-463.

* cited by examiner

*Primary Examiner*—Nathan Flynn
*Assistant Examiner*—Jude J Jean-Gilles
(74) *Attorney, Agent, or Firm*—Staas & Halsey LLP

(57) ABSTRACT

A method of controlling a terminal of the MPEG-4 system to enable to faster reproduce the selected contents through a caching mechanism includes, if the contents to be reproduced is selected, the terminal of the MPEG-4 system receives an initial object descriptor of the selected contents from a server, and then determines an object of stream and the priority based on the initial object descriptor, object descriptor, and a scene description. A random object is stored in the cache at the point of reproducing the random object constituting the contents. If a final update time of the object stored in the cache is identical with that of the object existing in the server, the object requested to be reproduced from the cache is reproduced. Accordingly, the method makes it possible to more promptly reproduce the contents requested by a user and to provide more stable contents to the user.

37 Claims, 5 Drawing Sheets

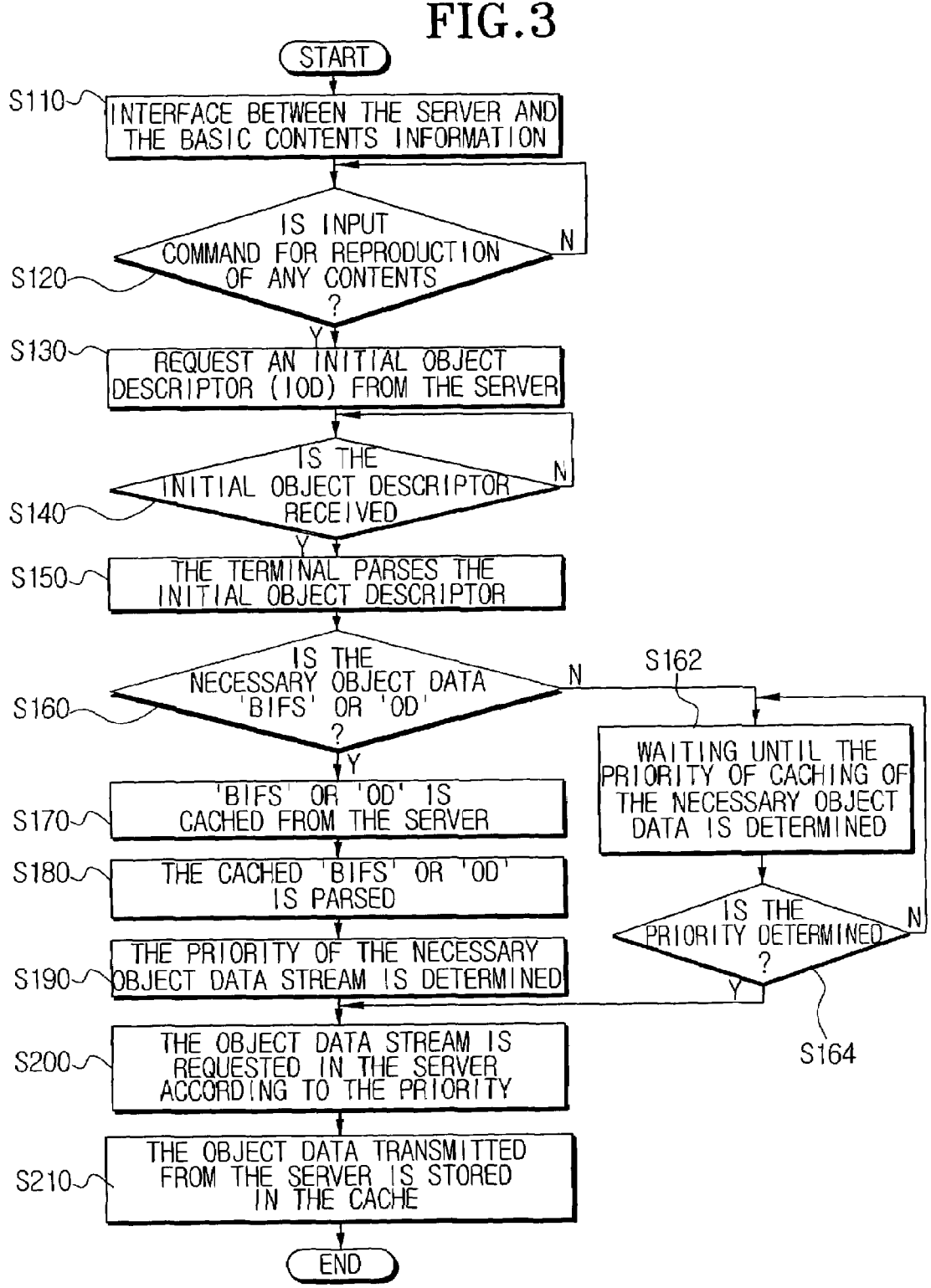

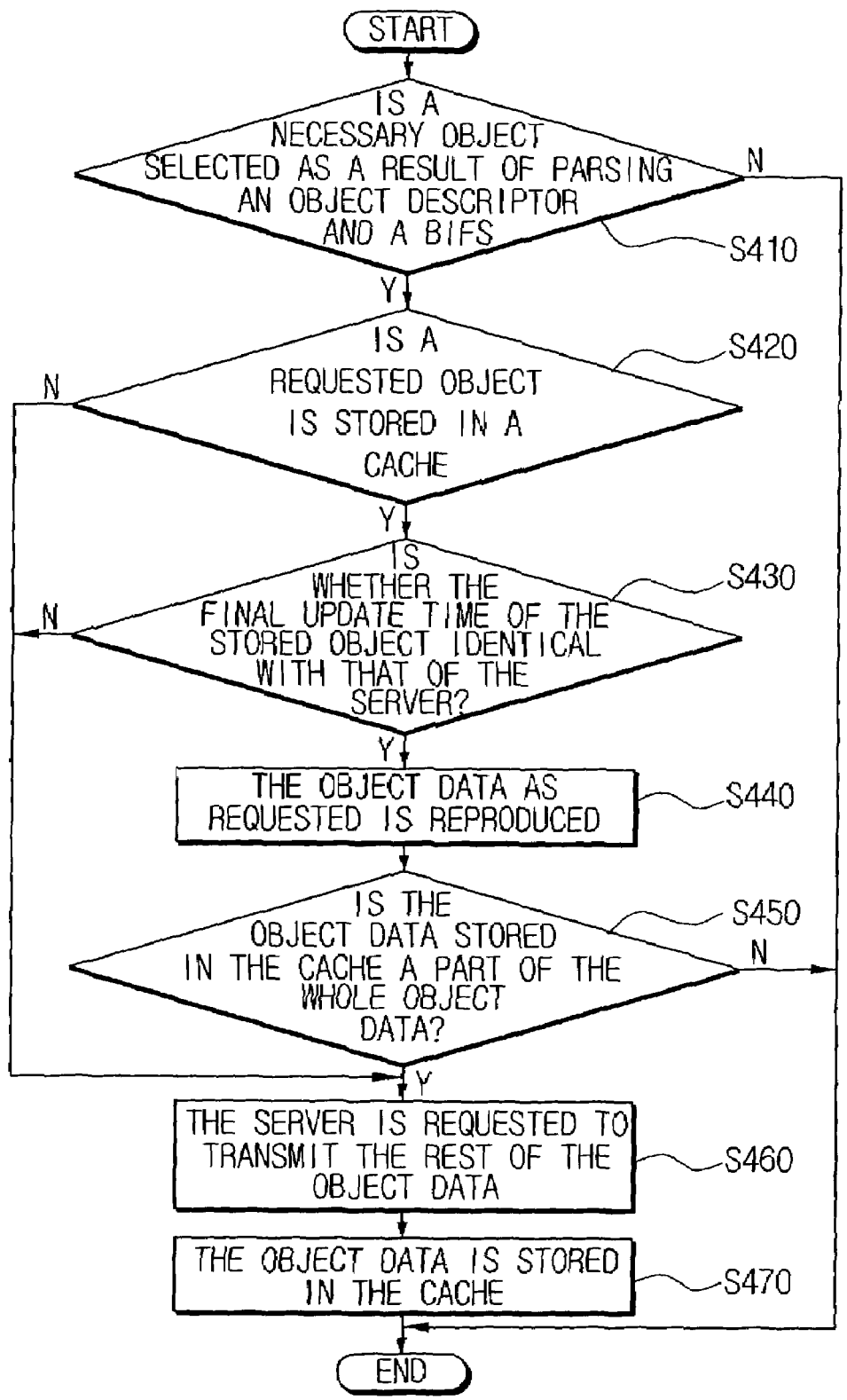

FIG.5A

| FINAL UPDATE TIME INFORMATION | MAP | STORAGE UNITS |
|---|---|---|
| STORAGE UNITS | STORAGE UNITS | STORAGE UNITS |
| STORAGE UNITS | STORAGE UNITS | . . . |

FIG.5B

| SL Header | Access Unit |
|---|---|

FIG.5C

| POINT OF FIRST STORAGE UNIT IN FILE | VOLUME VALUE OF EACH STORAGE UNIT | VOLUME VALUE OF EACH STORAGE UNIT |
|---|---|---|
| VOLUME VALUE OF EACH STORAGE UNIT | VOLUME VALUE OF EACH STORAGE UNIT | VOLUME VALUE OF EACH STORAGE UNIT | . . . |

US 7,370,115 B2

METHOD OF CONTROLLING TERMINAL OF MPEG-4 SYSTEM USING CACHING MECHANISM

CROSS-REFERENCE TO RELATED APPLICATION

This application claims the benefit of Korean Application No. 2001-86777, filed Dec. 28, 2001 in the Korean Intellectual Property Office, the disclosure of which is incorporated herein by reference.

BACKGROUND OF THE INVENTION

1. Field of the Invention

The present invention relates to a method of controlling a terminal of an MPEG-4 (Moving Picture Experts Group-4) system, and more particularly, to a method of controlling an MPEG-4 system using a caching mechanism to more rapidly reproduce the contents at a client side.

2. Description of the Related Art

MPEG-4 (Moving Picture Experts Group-4) is a technical standardization organization which relates to moving pictures and related audio signal compression and reproduction and which operates under the name of "WG11 (Working Group 11)" in the "SC29 (Sub-Committee 29)". Here, the "SC29" is an organization to establish the international standards of the multimedia related coding mechanisms under the JTC (Joint Technical Committee), which is jointly established by the International Standardization Organization (ISO) and the International Electrotechnical Conference.

Related to the MPEG-4 standard, there are technical standards regarding the moving picture and the moving picture related audio signal compression and reproduction such as the MPEG-1 and MPEG-2 standards. In the MPEG-1 and MPEG-2 standards, a sending end compresses the moving picture and speech information as input in a random volume according to the determined data throughput, and transmits the compressed moving picture and speech information in a bit stream. Then, a receiving end decodes the original moving picture and speech information from the bit stream and outputs the decoded moving picture and speech information on a screen or through a speaker.

The MPEG-4 standard is different from the MPEG-1 and MPEG-2 standards with respect to the input source. Specifically, one content consists of a number of objects. Here, the objects are an audio stream, a visual stream, a scene description stream and an object descriptor stream. Therefore, a screen consists of the scene descriptor object to constitute the screen, the object descriptor object to connect the scene descriptor to the audio and visual streams, and the audio and visual stream object to be displayed on the screen.

Further, the MPEG-4 standard is constituted so that a synthetic picture, such as computer graphics or three-dimensional data (facial animation), and synthetic sound information, such as MIDI, TTS (Text-To-Speech), are processed together. The existing standards are provided on condition that any determined technique should be designed in a semiconductor chip and manufactured in a system. However, the MPEG-4 standard develops a number of tools to perform various functions and allows a flexibility to combine the tools freely if necessary and to realize any desired functions.

The unique feature of the MPEG-4 standard is to concentrate the utmost effort on an error correction coding mechanism since, at the outset, it was assumed that the MPEG-4 standard would be applied in mobile communication systems. Based on the above-mentioned feature, the system group has adopted the multiplexing mode and the synchronizing mode to control the bit stream according to the data service between the system and the network.

The main fields of application of the above-developed technology are, for example, multimedia data services of a portable device, Internet services, remote medical and educational systems, Interactive TV, Interactive game machines and digital video discs (DVD).

FIG. 1 is a block diagram illustrating a process of reproducing the contents in a conventional MPEG-4 system terminal. A terminal of a client side is connected to a server, and an interface between the server and the basic contents information is performed (S1). When a command to reproduce the contents is input in the terminal of the client side by a user (S2), the client terminal requests from the server an initial object descriptor (IOD) (S3). If the IOD is received (S4), the IOD is parsed in the client terminal (S5). As a result of parsing, it is determined whether the binary format scene for description (BIFS) streaming, the object description (OD) streaming, the visual streaming and/or the audio streaming are required (S6). If the object data streaming is required, the necessary object data is requested to the server (S7). When the object data requested to the server is received (S8) and if the received data is the BIFS or OD, the terminal parses each of the BIFS and OD (S9) and re-performs the operation S6. If any further streaming of the object data is not required, the reproduction of the contents is ended. Otherwise, if the data received in the terminal is neither BIFS nor OD, the received object data is reproduced (S10). Further, if there exists any further object data to be received, the necessary object data is requested to the server (S7). However, if there is no more object data to be received, the reproduction of the contents is ended (S12).

However, in the terminal of the above-mentioned MPEG-4 system, since the object data is provided by the server side in response to the request from the client side, there is the problem that it takes a slightly longer time until the contents are reproduced. In other words, when the requested contents consists of a number of objects, the server transmits each object through the streaming mode to the client. In this connection, the time for the client to request the object data from the server and the time required until the response from the server is transmitted are additionally required and, as a consequence, it takes a slightly longer time until the contents are reproduced.

Moreover, when a number of objects are requested at the same time, there is the other problem of causing any overload in the network and system.

SUMMARY OF THE INVENTION

It is, therefore, an object of the present invention to provide a method of controlling a terminal of the MPEG-4 system using a caching mechanism to enable a more rapid reproduction of the contents and to solve the above and other problems.

Additional objects and advantages of the invention will be set forth in part in the description which follows and, in part, will be obvious from the description, or may be learned by practice of the invention.

To achieve the above and other objects, there is provided a method of controlling the terminal of the MPEG-4 system according to an embodiment of the present invention, which comprises identifying an object of the contents to be cached; caching the object data for the object from a server and storing the object data in a cache; if a reproduction of the object is requested, determining whether the object data is stored in the cache; and if the object data is stored in the cache, reproducing the object requested to be reproduced from the object data stored in the cache.

According to an aspect of the invention, the identifying the object to be cached comprises identifying streams as the object to be cached which are predetermined according to the kinds of streams as transmitted from the server, and identifying the priority of the streams.

According to another aspect of the invention, the streams for caching include at least one of a scene description stream (binary format scene for description), an object descriptor stream, a visual stream and an audio stream.

According to yet another aspect of the invention, the scene description stream and the object descriptor stream are given the higher priority than the visual stream and the audio stream.

According to a still another aspect of the invention, after parsing the binary format scene for description stream, an initial screen entry stream is given a higher priority.

According to a still another aspect of the invention, after parsing the binary format scene for description stream, a repeatedly using stream and a stream which is referred to using USE/DEF in many places on one scene of the object are given a higher priority.

According to still yet another aspect of the invention, when the server receives a list of the streams made out in the order of frequency in the request by the client, the streams included in the received list are given the higher priority.

According to a further aspect of the invention, the object data stored in the cache includes a plurality of storage units having a final update time of the contents, a map, and an access unit for a random access of the stream.

According to a yet further aspect of the invention, the storage unit comprises the access unit and a sync layer header field.

According to a still further aspect of the invention, the method of controlling the terminal of the MPEG-4 system further comprises comparing a final update time of the object data stored in the cache to a final update time of the object data stored in the server.

According to a still yet further aspect of the invention, as a result of the comparison, if the two final update times are identical with each other, the object is reproduced from the cache in the reproducing the object and, if the two final update times are not identical with each other, the server is requested to transmit the object data.

According to an additional aspect of the invention, in the caching the object from the server and storing the object in the cache, the amount of data to be reproduced for a predetermined time is cached and stored.

According to a yet additional aspect of the invention, in the reproducing, a difference between a time stamp of a final access unit and a time stamp of a start access unit among the access units stored in the cache is calculated, such that, as a result, if a value is determined as being less than a predetermined threshold, the rest of the object is requested in the server to be reproduced, the minimum value of the threshold uses the time when a first one of the access units arrives when the stream of the object is requested to the server, and the predetermined threshold is set up according to the media.

According to a still additional aspect of the invention, the method of controlling the terminal of the MPEG-4 system further comprises requesting the server to transmit the object requested to be reproduced if the object not stored in the cache is requested to be reproduced; if the object requested to be reproduced is received from the server, reproducing the object received; and if the reproduced object data is determined as the object data to be cached, storing the object data in the cache.

According to a still yet additional aspect of the invention, according to the method of controlling the terminal of the MPEG-4 system, the object data required to be reproduced is stored in the terminal and then reproduced which makes it possible to promptly provide the contents and to more stably reproduce the contents against any effects due to network congestion.

BRIEF DESCRIPTION OF THE DRAWINGS

The above and other objects, features and advantages of the present invention will become more apparent and more readily appreciated from the following detailed description when taken in conjunction with the accompanying drawings, in which:

FIG. 3 is a flow chart illustrating a process of caching an object belonging to the contents of the terminal of the MPEG-4 system shown in FIG. 2;

FIG. 4 is a flow chart illustrating a process of reproducing the object belonging to the contents of the terminal of the MPEG-4 system shown in FIG. 2; and FIGS. 5A through 5C illustrate a structure of a file stored in a cache according to an embodiment of the invention.

DETAILED DESCRIPTION OF THE EMBODIMENTS

Figure 1:
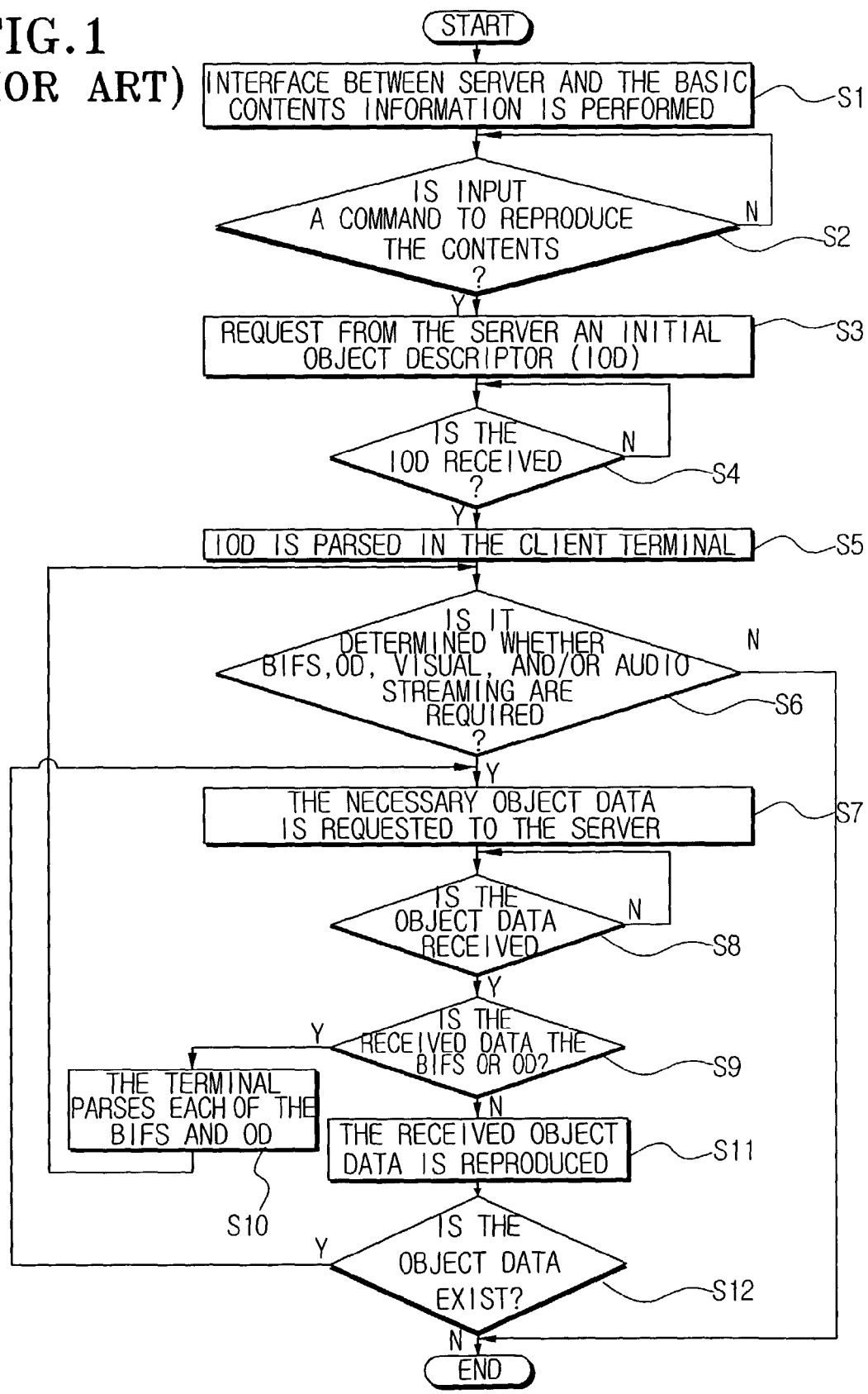
FIG. 1 is a flow chart illustrating a process of reproducing the contents in the terminal of a conventional MPEG-4 system.

Embodiments of the present invention will now be described with reference to the accompanying drawings. In the following description, like reference numerals are used for the same elements even in different drawings. The matters defined in the description such as a detailed construction and elements of a circuit or program are examples only and assist in providing a comprehensive understanding of the invention. Thus, it is apparent that the present invention can be carried out without limitation to those defined matters. Also, well-known functions or constructions are not described in detail since they would obscure the invention with unnecessary detail.

Figure 2:
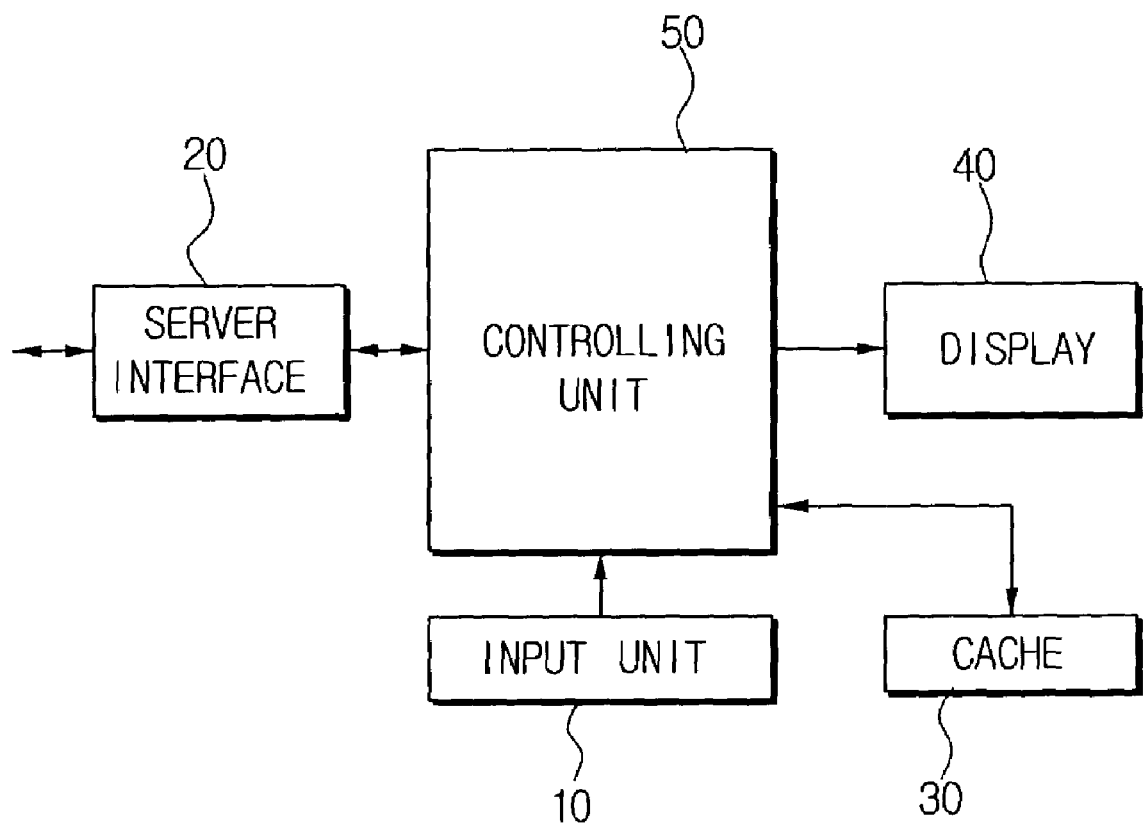
FIG. 2 is a block diagram illustrating a terminal of a MPEG-4 system according to an embodiment of the present invention.

FIG. 2 is a block diagram illustrating a terminal of the MPEG-4 system according to an embodiment of the present invention. The terminal of the MPEG-4 includes an input 10, a server interface 20, a cache 30, a display 40 and a control unit 50. The input 10 includes keys used by a user to input a command to select and reproduce the contents. However, it is understood that other types of input 10 can be used, such as touch screen displays, a computer mouse, a receiver for a remote control device, or any other device through which input is received into a system.

The interface 20 provides an interface between the server (not shown) and data sent from the terminal. The cache 30 stores object data for an object is provided from the server. The display 40 displays the contents including the object under the control of the control unit 50. The control unit 50 pre-caches the contents provided from the server and to be stored in the cache 30. If a request for reproduction of random contents is input through the input 10, the control unit 50 pre-caches the objects which make up the requested contents provided in the server and stores the objects as object data in the cache 30. If the object to be reproduced is the object stored as object data in the cache 30, the object requested to be reproduced by the object data pre-stored in the cache 30 is displayed in the display 40.

FIG. 3 is a flow chart illustrating an embodiment of an operation of caching the terminal of the MPEG-4 system shown in FIG. 2. A terminal of a client side is connected to a server and performs an interface between the server and the basic contents information (S110). If a command is input into the terminal to reproduce contents (S120), the client terminal requests an initial object descriptor (IOD) from the server (S130). Then, if the initial object descriptor is received (S140), the terminal parses the initial object descriptor (IOD) (S150). As a result of the parsing, it is determined whether the necessary object data is a 'BIFS' or an 'OD' (S160). If the necessary object data is the BIFS or the OD, the BIFS or the OD is cached from the server (S170). Then, the cached BIFS or OD is parsed (S180), and the priority of the necessary object data stream is determined (S190).

If it is determined from the parsed IOD that the necessary object data is not the 'BIFS' or the 'OD' in operation S160, the system waits until the priority of caching of the necessary object data is determined (S162). The priority is determined based upon whether the priority is determined in operation S190 (S164). If the priority is determined after operation S190 or S164, the object data stream is requested from the server according to the determined priority (S200). Then the object data transmitted from the server is stored in the cache (S210)

In the MPEG-4 system, the scene description stream, the object descriptor stream, the visual stream, and the audio stream are frequently used and have a high possibility of being repeated. As such, according to an aspect of the invention, these are predetermined objects of caching. Further, since the scene description stream and the object descriptor stream are indispensable to the construction of the scene, these streams are preferentially cached ahead of the other streams according to another aspect of the invention.

According to an aspect of the invention, for the visual stream, the audio stream, and the scene description stream, the higher priority is given to the stream to be preferentially used and the stream to be repeatedly used after parsing the BIFS (Binary Format Scene for Description) stream. For instance, the higher priority is given to the object stream to be used in a first screen of the scene, the object streams to be repeatedly played using a loop field, and the object stream to be referred in a number of places using a USE/DEF. However, when supporting proactive caching, when the list of the streams frequently requested is received from the server, the streams included in the received list have the higher priority.

As shown in FIG. 5A, each file stored in the cache includes a final update time of an object, a map, and storage units. The final update time of the object is the time that the objected selected in the server was finally updated. The map indicates the first storage unit (a sync layer header and an access unit as shown in FIG. 5B) included in the file stored in the cache and the volume value of each storage unit. The map enables a random access of the stream as shown in FIG. 5C. As shown in FIG. 5B, each storage unit comprises an access unit and a sync layer header field corresponding to the access unit. Here, the file includes the storage units under the amount capable of being reproduced during a specified time.

That is, if the object data is bigger than the capacity of the cache 30, only as much of the object data is cached and stored as is possible.

FIG. 4 is a flow chart illustrating an embodiment of an operation of reproducing the contents of the MPEG-4 system terminal as shown in FIG. 2. When a command to reproduce the contents is input through an input 10 and a necessary object is selected as a result of parsing an object descriptor and a BIFS (S410), it is determined whether object data for the requested object is stored in the cache 30 (S420). If the object data is not stored in the cache 30, a server is requested to transmit the object data (S460). However, if the object data is stored in the cache 30, a comparison is made comparing a final update time between the stored object data and the object data stored in the server to determine whether the final update times are identical (S430). If the final update times are identical, the object data is read out from the cache 30 and the object data as requested is reproduced through a display 40 (S440). If the final update times are not identical, the server is requested to transmit the object data requested to be reproduced (S460). When the object data is transmitted from the server 30, the object data is stored in the cache 30 (S470). For this, the final update time of the contents is clearly stated in the server.

If the object data stored in the cache 30 is a part of the whole object data (S450), the server is requested to transmit the rest of the object data (S460). According to an aspect of the invention, the request time to request the rest of the object data from the server is a time under the threshold setting the difference between a time stamp of a last access unit and a time stamp of a start access unit among the access units included in the reproduction remaining amount (i.e., the total time of the remaining amount of the data to be reproduced) among the object data stored in the cache 30.

Here, a minimum value of the threshold is the time on which the access unit first arrives when requesting the server to transmit the object data. Since the first arrival time is different by media, it is possible to calculate, maintain and use the threshold per media. If data stored in the cache is not used, the object is reproduced receiving the data transmitted from the server. If the object data as received is determined as an object to be cached, the object data for caching is stored, reproducing the data transmitted from the server.

According to an aspect of the invention, the controlling unit 50 is a computer implementing the methods in FIGS. 3 and 4 using data encoded on a computer readable medium.

According to the method of controlling the terminal of the MPEG-4 system using the caching mechanism in the present invention, the contents requested to be reproduced by a user can be more promptly reproduced by caching the data necessary for the caching. Further, it provides more stable contents to users because it is less effected by the network congestion.

While the invention has been shown and described with reference to certain embodiments thereof, it will be understood by those skilled in the art that various changes in form and details may be made therein without departing from the spirit and scope of the invention as defined by the appended claims and equivalents thereof.

What is claimed is:

1. A method of controlling a terminal of an MPEG-4 system, the method comprising:
   identifying an object to be cached;
   caching the object from a server and storing the same in a cache;

receiving a request to reproduce a requested object and determining whether the object stored in the cache includes the requested object; and reproducing the requested object from the object stored in the cache, if the requested object is stored in the cache, wherein the identifying comprises identifying a predetermined priority of the streams to be transmitted from the server, wherein the identifying comprises identifying the object to be cached according to kinds of streams to be transmitted from the server, wherein the priority assigns a higher priority to a scene description stream and an object descriptor stream as compared to a visual stream and an audio streams;

requesting a transmission of the requested object from the server if the requested object is not the object stored in the cache;

reproducing a received object from the server if the object requested to be transmitted from the server is received; and storing the data of the received object in the cache if the received object data as reproduced is determined as the object to be cached.

2. The method of claim 1, wherein the stream comprises at least one of the scene description stream, the object descriptor stream, the visual stream and the audio stream.

3. The method of claim 2, wherein, if the scene descriptor stream includes a binary format scene for description (BIFS) stream, the BIFS stream is parsed and the priority assigns a higher priority to an initial entry stream, a repeatedly used stream and a stream referred to in a number of places using USE/DEF as determined through the parsing of the BIFS stream.

4. The method of claim 1, wherein the priority assigns a higher priority to the stream included in a stream list, if the server receives the stream list made out according to a frequency of request from a client.

5. The method of claim 1, wherein the object stored in the cache comprises:

a final update time of the object, a map for a random access of a stream, and storage units, and each of the storage units includes an access unit.

6. The method of claim 5, wherein each of the storage units comprises the access unit and a sync layer header field.

7. The method of claim 5, further comprising comparing the final update time of the object stored in the cache and a final update time of the object recorded in the server, wherein the object from the cache is reproduced if the final update times are identical.

8. The method of claim 5, wherein the caching comprises caching and storing an amount of data for the object capable of being reproduced during a specific time.

9. The method of claim 8, wherein the reproducing comprises:

calculating a difference between a time stamp of a last access unit and a time stamp of a start access unit among the access units stored in the cache to obtain a result value; and if the result value is determined to be less than a predetermined threshold, requesting a remainder of the access units of the object from the server and reproducing data from the remainder of the access units.

10. The method of claim 9, wherein a minimum value of the predetermined threshold is an arrival time of a first one of the access units when requesting the stream of the object from the server.

11. The method of claim 10, wherein the threshold is set-up according to types of media.

12. A terminal for use in reproducing MPEG-4 encoded data in objects received from a source, comprising:

an interface through which the terminal receives the MPEG-4 data from the source;

a memory;

an input unit which receives a request to play a requested object; and a priority-determining controller which, in response to the request to play the requested object, controls object data to be received from the source and stored in the memory, compares the stored object data with the requested object, and, if the stored object data corresponds with the requested object, reproduces the requested object using the stored object data retrieved from the memory, wherein the priority-determining controller identifies a predetermined priority order of the objects to be requested and stored in the memory, and requests the objects according the identified predetermined priority order, wherein the priority-determining controller identifies the requested object to be stored according to kinds of streams to be received from the source, wherein the predetermined priority assigns a higher priority to a scene description stream and an object descriptor stream as compared to a visual stream and an audio stream, and wherein the priority-determining controller further:

determines compares the stored object data and object data corresponding to the requested object data stored at the source to determine which object data was last updated, requests the object data stored at the source if the object data stored at the source was last updated, and reproduces the stored object data from the memory if the object data stored in the memory was last updated.

13. The terminal of claim 12, wherein the priority-determining controller requests an initial object descriptor from the source to determine the object data to be requested and stored in the memory.

14. The terminal of claim 12, wherein the priority-determining controller, if the requested object does not correspond with the stored object data, requests the requested object be received from the source and reproduces the requested object using object data received from the source.

15. The terminal of claim 12, wherein the priority-determining controller further:

determines whether the object data corresponding to the requested object corresponds to all of the object data required to reproduce the requested object, and if the object data corresponding to the requested object corresponds to less than all of the object data required to reproduce the requested object, requests and stores a remainder of the object data from the source as the requested object is being reproduced from the object data stored in the memory.

16. The terminal of claim 12, wherein, if multiple objects are requested, the priority-determining controller further identifies a predetermined priority of the streams for the objects to be requested and stored in the memory.

17. The terminal of claim 16, wherein each stream comprises at least one of a scene description stream, an object descriptor stream, a visual stream and an audio stream.

18. The terminal of claim 17, wherein, if the scene descriptor stream includes a binary format scene for description (BIFS) stream, the BIFS stream is parsed and the predetermined priority assigns a higher priority to an initial entry stream, a repeatedly used stream and a stream referred to in a number of places using USE/DEF as determined through the parsing of the BIFS stream.

19. The terminal of claim 16, wherein predetermined the priority assigns a higher priority to the stream included in a stream list, where the stream list reflects a frequency of request for the streams.

20. The terminal of claim 12, wherein the stored object data in the memory comprises:
   a final update time of the object, a map for a random access of a stream, and storage units, and
   each of the storage units includes an access unit.

21. The terminal of claim 20, wherein each of the storage units comprises the access unit and a sync layer header field.

22. The terminal of claim 20, wherein the priority-determining controller further compares the final update time of the stored object data stored in the memory and a final update time of the object data stored at the source, and the stored object data is reproduced from the cache if the final update times are identical.

23. The terminal of claim 20, wherein priority-determining controller stores the object data in the memory according to an amount of the object data capable of being reproduced during a specific time.

24. The terminal of claim 23, wherein the priority-determining controller further calculates a difference between a time stamp of a last access unit and a time stamp of a start access unit among the access units stored in the memory to obtain a result value, and
   if the result value is determined to be less than a predetermined threshold, requesting a remainder of the access units of the requested object from the source and reproducing data from the remainder of the access units.

25. The terminal of claim 24, wherein a minimum value of the predetermined threshold is an arrival time of a first one of the access units when requesting the stream of the requested object from the source.

26. The terminal of claim 25, wherein the threshold is set-up according to types of media.

27. A computer readable storage medium encoded with processing instructions for implementing a method of controlling a terminal of an MPEG-4 system performed by a computer, the method comprising:
   identifying an object data to be cached according to kinds of streams to be received from a source, wherein the identifying comprises identifying a predetermined priority of the streams to be received from the source;
   caching object data from a source and storing the cached object data in a cache;
   receiving a request to reproduce a requested object and determining whether the stored object data includes the requested object;
   reproducing the requested object from the stored object data, if the stored object data includes the requested object;
   requesting a transmission of the requested object from the source if the stored object data does not include the requested object;
   reproducing a received object from the source if the object requested to be transmitted from the source is received; and
   storing the object data of the received object in the cache if the received object data is determined to be the object data to be cached,
   wherein the stream comprises at least one of a scene description stream, an object descriptor stream, a visual stream and an audio stream, and
   wherein the priority assigns a higher priority to a scene description stream and an object descriptor stream as compared to a visual stream and an audio stream.

28. The computer readable medium of claim 27, wherein, if the scene descriptor stream includes a binary format scene for description (BIFS) stream, the method further comprises parsing the BIFS stream and the priority assigns a higher priority to an initial entry stream, a repeatedly used stream and a stream referred to in a number of places using USE/DEF as determined through the parsing of the BIFS stream.

29. The computer readable medium of claim 27, wherein the priority assigns a higher priority to the stream included in a stream list, if the source receives the stream list made out according to a frequency of request from a client.

30. The computer readable medium of claim 27, wherein the stored object data comprises:
   a final update time of the object data, a map for a random access of a stream, and storage units, and
   each of the storage units includes an access unit.

31. The computer readable medium of claim 30, wherein each of the storage units comprises the access unit and a sync layer header field.

32. The computer readable medium of claim 30, the method further comprising comparing the final update time of the stored object data stored in the cache and a final update time of the object recorded in the source, wherein the stored object data is reproduced from the cache if the final update times are identical.

33. The computer readable medium of claim 30, wherein the caching comprises caching and storing an amount of object data capable of being reproduced during a specific time.

34. The computer readable medium of claim 33, wherein the reproducing comprises:
   calculating a difference between a time stamp of a last access unit and a time stamp of a start access unit among the access units stored in the cache to obtain a result value; and
   if the result value is determined to be less than a predetermined threshold, requesting a remainder of the access units of the object from the source and reproducing data from the remainder of the access units.

35. The computer readable medium of claim 34, wherein a minimum value of the predetermined threshold is an arrival time of a first one of the access units when requesting the stream of the object from the source.

36. The computer readable medium of claim 35, wherein the threshold is set-up according to types of media.

37. The computer readable medium of claim 27, the method further comprising:
   determining whether the stored object data corresponding to the requested object corresponds to all of the object data required to reproduce the requested object, and
   if the stored object data corresponding to the requested object corresponds to less than all of the object data required to reproduce the requested object, requests and stores a remainder of the object data from the source as the requested object is being reproduced from the stored object data.

* * * * *

UNITED STATES PATENT AND TRADEMARK OFFICE
CERTIFICATE OF CORRECTION

PATENT NO. : 7,370,115 B2
APPLICATION NO. : 10/277739
DATED : May 6, 2008
INVENTOR(S) : Dae-gyu Bae et al.

It is certified that error appears in the above-identified patent and that said Letters Patent is hereby corrected as shown below:

Column 7, Line 14, change "streams;" to --stream;--.

Signed and Sealed this

Thirtieth Day of September, 2008

JON W. DUDAS
*Director of the United States Patent and Trademark Office*